(12) United States Patent
Green et al.

(10) Patent No.: US 7,792,013 B2
(45) Date of Patent: Sep. 7, 2010

(54) LOW DENSITY LATTICE CODE GENERATOR MATRICES USING MUTUALLY ORTHOGONAL LATIN SQUARES

(75) Inventors: Marilynn P. Green, Coppell, TX (US); Jyrki Lahtonen, Rusko (FI)

(73) Assignee: Nokia Corporation, Espoo (FI)

( * ) Notice: Subject to any disclaimer, the term of this patent is extended or adjusted under 35 U.S.C. 154(b) by 85 days.

(21) Appl. No.: 12/184,030

(22) Filed: Jul. 31, 2008

(65) Prior Publication Data

US 2010/0027408 A1 Feb. 4, 2010

(51) Int. Cl.
*H04J 11/00* (2006.01)
(52) U.S. Cl. ...................................... 370/208
(58) Field of Classification Search ................ 370/208
See application file for complete search history.

(56) References Cited

U.S. PATENT DOCUMENTS

2007/0283210 A1* 12/2007 Prasad et al. ................. 714/755

OTHER PUBLICATIONS

"Code word", Wikipedia, retrieved Jul. 28, 2008 from http://en.wikipedia.org/wiki/Codeword, pp. 1-2.
"Incidence matrix", Wikipedia, retrieved Jul. 28, 2008 from http://en.wikipedia.org/wiki/Incidence_matrix, pp. 1-3.
"Low-density parity-check code", Wikipedia, retrieved Jul. 28, 2008 from http://en.wikipedia.org/wiki/Low-density_parity-check_code, pp. 1-5.
Sommer, et al., "Low Density Lattice Codes", arXiv:0704.1317v1 [cs.IT] (Apr. 11, 2007), pp. 1-24.
Hsiao, et al., "Orthogonal Latin Square Codes", IBM J. Res. Develop. Latin Square Codes, (Jul. 1970), pp. 390-394.
"Generator matrix", Wikipedia, retrieved Jul. 28, 2008 from http://en.wikipedia.org/wiki/Generator_matrix, pp. 1-2.
"Latin square", Wikipedia, retrieved Jul. 28, 2008 from http://en.wikipedia.org/wiki/Latin_square, pp. 1-6.

* cited by examiner

*Primary Examiner*—Melvin Marcelo
(74) *Attorney, Agent, or Firm*—Brake Hughes Bellermann LLP

(57) ABSTRACT

According to one general aspect, a method including receiving noisy data via a communications channel, wherein the noisy data includes a clean data component and a noise component. In various embodiments, the method may also include decoding, utilizing a low-density lattice code (LDLC) matrix, the received noisy data to substantially recover the clean data component. In some embodiments, the LDLC matrix may not include a matrix of less than a length of six cycles. In one embodiment, the LDLC matrix may be algebraically constructed. In various embodiments, the method may include storing the decoded clean data component.

19 Claims, 11 Drawing Sheets

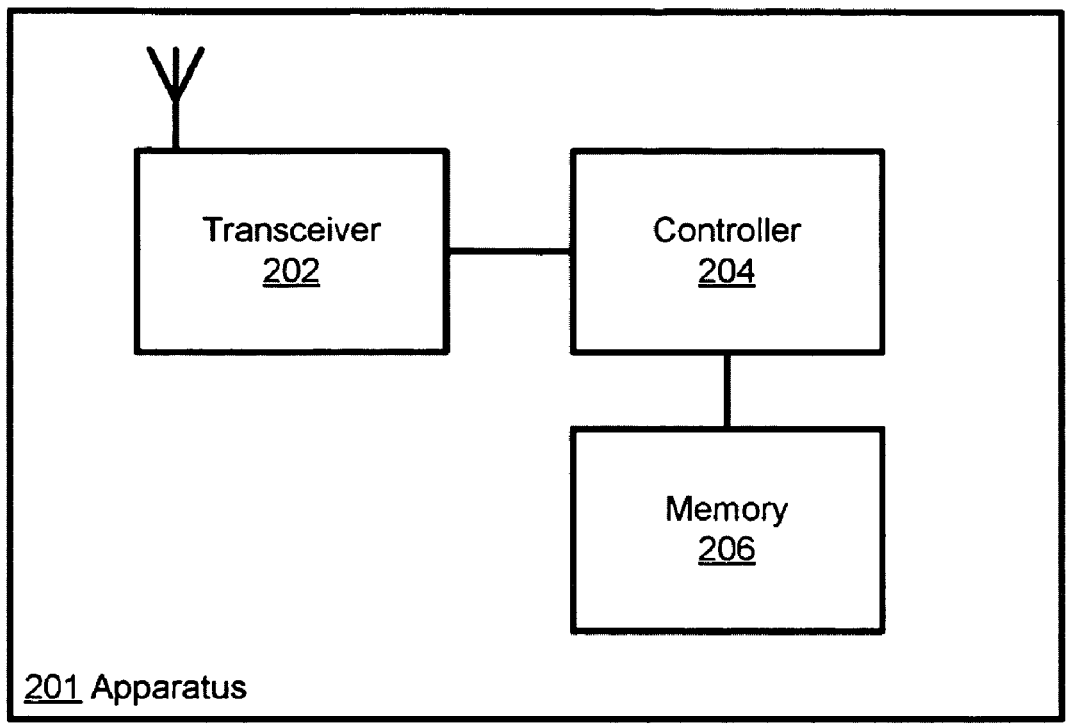
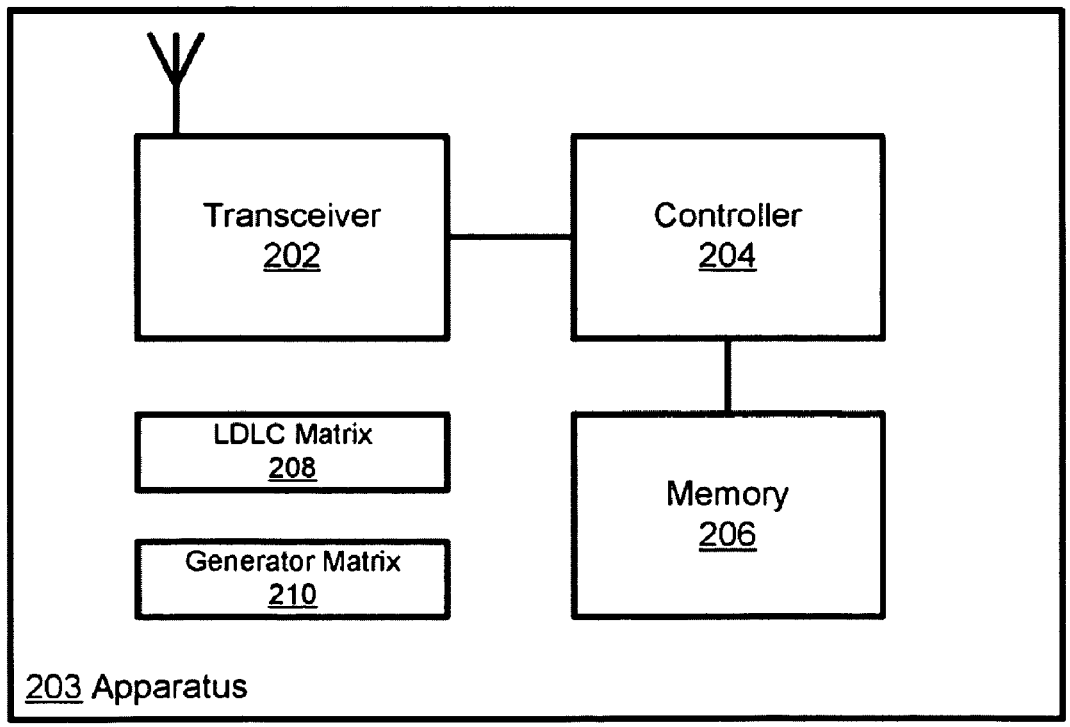
FIG. 2

500

(Relevant Art)

800

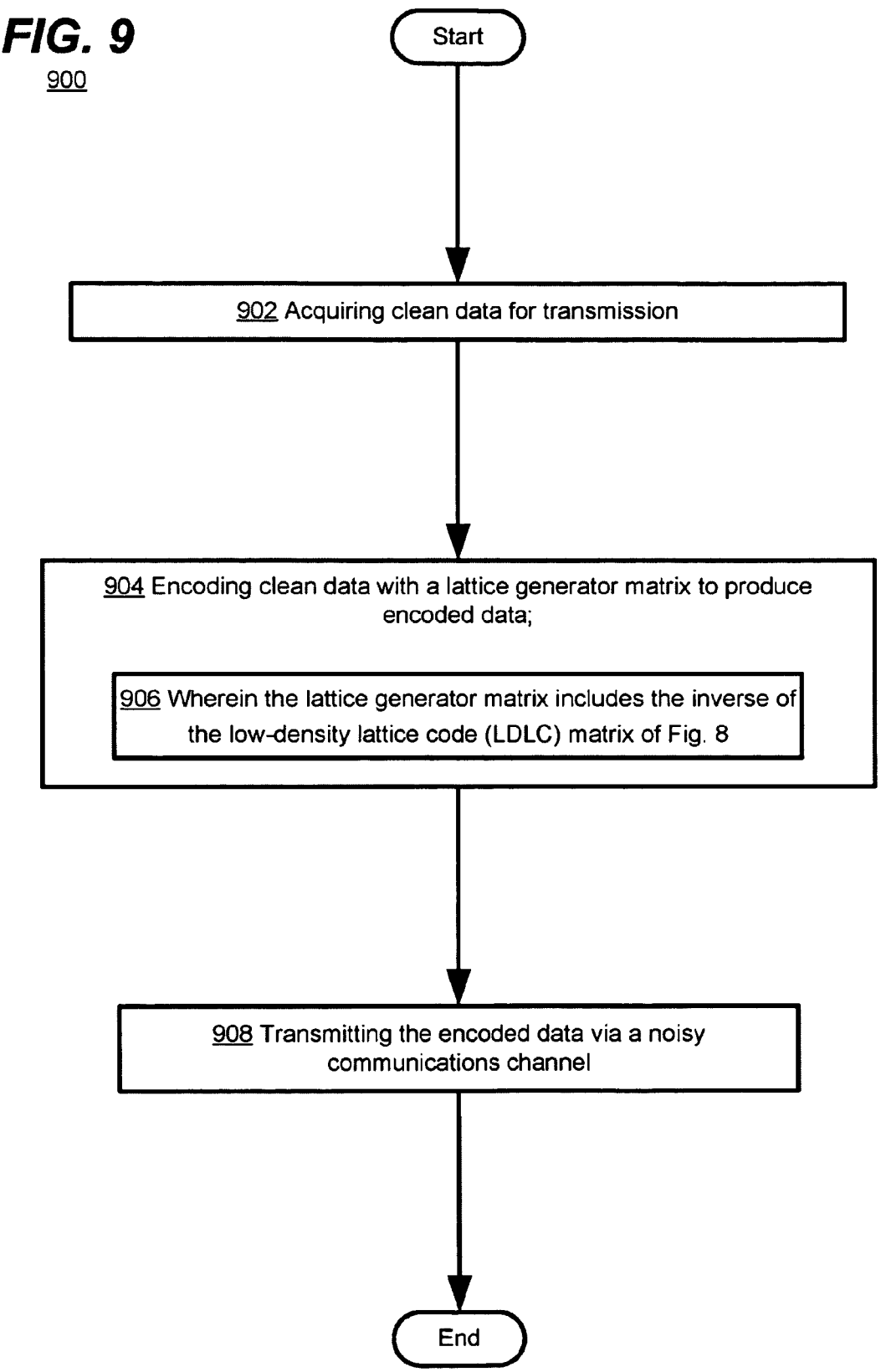

US 7,792,013 B2

LOW DENSITY LATTICE CODE GENERATOR MATRICES USING MUTUALLY ORTHOGONAL LATIN SQUARES

TECHNICAL FIELD

This description relates to communications technology, and more specifically to the creation and use of a lattice check code.

BACKGROUND

Often in communications systems data is transmitted through a noisy medium. As a result, typically the signal that reaches the receiver is not the pure clean transmitted data, but instead a mixture of the clean transmitted data and noise that was acquired as the data passed through the transmission medium. Such noise is usually minimized in a wired communication system (e.g., Ethernet), but it more prominent in a wireless or radio communications system (e.g., WiMAX, Wi-Fi, etc.)

Often to minimize the effect of the added noise, a clean version of the data (or "codeword" in the parlance of the art) is encoded with an error correction scheme. Typically a codeword is a sequence of symbols assembled in accordance with the specific rules of a code and assigned a unique meaning. In various systems an error correction scheme may include a parity check matrix. Typically, a parity check matrix is an algebraic matrix that facilitates the recovery of the codeword or clean data from the received noisy data.

SUMMARY

According to one general aspect, a method including receiving noisy data via a communications channel, wherein the noisy data includes a clean data component and a noise component. In various embodiments, the method may also include decoding, utilizing a low-density lattice code (LDLC) matrix, the received noisy data to substantially recover the clean data component. In some embodiments, the LDLC matrix may not include any cycles of length less than six. In one embodiment, the LDLC matrix may be algebraically constructed. In various embodiments, the method may include storing the decoded clean data component.

According to another general aspect, an apparatus including a transceiver, a controller, a memory, and a low-density lattice code (LDLC) matrix. In various embodiments, the transceiver may be configured to receive noisy data via a communications channel, wherein the noisy data includes a clean data component and a noise component. In one embodiment, the controller may be configured to decode, utilizing a low-density lattice code (LDLC) matrix, the received noisy data to substantially recover the clean data component. In some embodiments, the memory may be configured to store the decoded clean data component. In various embodiments, the low-density lattice code (LDLC) matrix that may not include any cycles of length less than six, and wherein LDLC matrix is algebraically constructed.

According to another general aspect, an apparatus may include a selected prime number. The apparatus may also include, in one embodiment, a Latin square generator configured to generate a plurality of mutually orthogonal Latin squares of a size equal to the selected prime number. In various embodiments, the apparatus may further include an incidence matrix generator configured to, for each Latin square, produce an incidence matrix based upon the respective Latin square. In some embodiments, the apparatus may comprise a matrix concatenator configured to create a mapping matrix, based upon in part the incidence matrixes, that comprises a square matrix. Wherein each row includes a number of elements equal to the selected prime number squared, a number of non-zero elements equal to the selected prime number, and wherein each non-zero element has a value of one. The apparatus may further comprise, in one embodiment, a sparse vector generator configured to make a sparse vector including the prime number of elements, in which the value the elements range between one and zero, inclusive. In various embodiments, the apparatus may also include a combiner configured to assign a value to each non-zero element of the mapping matrix utilizing a corresponding value of the sparse vector. And, in one embodiment, the apparatus may include a random sign multiplier configured to construct a low-density lattice code (LDLC) matrix utilizing the assigned matrix by multiplying each non-zero element by a randomly determined one or negative one.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 2 is a block diagram of two example embodiments of an apparatus in accordance with the disclosed subject matter.

FIG. 9 is a flowchart of an example embodiment of a technique in accordance with the disclosed subject matter.

DETAILED DESCRIPTION

Figure 1:
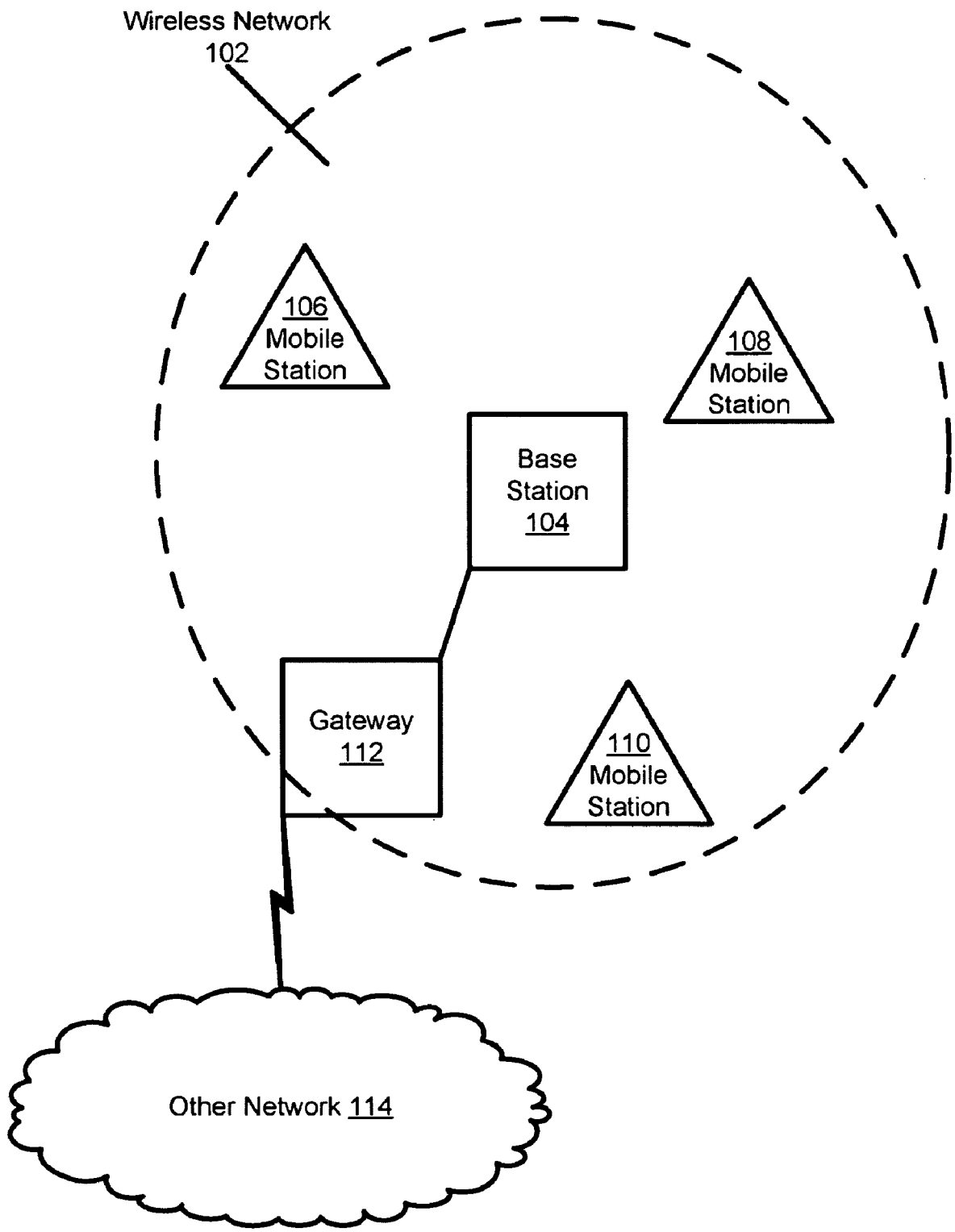
FIG. 1 is a block diagram of an example embodiment of a system in accordance with the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network 114, such as a Local Area Network, a Wide Area Network (WAN), the Internet, etc. In various embodiments, the base station 104 may be coupled or connected with the other network 120 via an access network controller (ASN) or gateway (GW) 112 that may control, monitor, or limit access to the other network.

FIG. 2 is also a block diagram of a communications device 201 in accordance with an example embodiment of the disclosed subject matter. In one embodiment, the communications device 201 may include a base station (BS), gateway (GW), or a mobile station (MS) such as that illustrated in FIG. 1. In one embodiment, the communications device 201 may include a transceiver 202, a controller 204, and a memory 206. In some embodiments, the transceiver 202 may include a wireless transceiver configured to operate based upon a wireless networking standard (e.g., WiMAX, WiFi, WLAN, etc.). In other embodiments, the transceiver 202 may include a wired transceiver configured to operate based upon a wired networking standard (e.g., Ethernet, etc.). In various embodiments, the controller 204 may include a processor. In various embodiments, the memory 206 may include permanent (e.g., compact disc, etc.), semi-permanent (e.g., a hard drive, etc.), and/or temporary (e.g., volatile random access memory, etc.) memory. For example, some operations illustrated and/or described herein, may be performed by a controller 204, under control of software, firmware, or a combination thereof. In another example, some components illustrated and/or described herein, may be stored in memory 206.

FIG. 2 is also a block diagram of a communications device 203 in accordance with an example embodiment of the disclosed subject matter. In one embodiment, the communications device 203 may include a base station (BS), gateway (GW), or a mobile station (MS) such as that illustrated in FIG. 1. In one embodiment, the communications device 203 may include a wireless transceiver 202, a controller 204, and a memory 206. In some embodiments, the transceiver 202 may include a wireless transceiver configured to operate based upon a wireless networking standard (e.g., WiMAX, WiFi, WLAN, etc.). In other embodiments, the transceiver 202 may include a wired transceiver configured to operate based upon a wired networking standard (e.g., Ethernet, etc.). In various embodiments, the controller 204 may include a processor. In various embodiments, the communications device 203 may include a low-density lattice code (LDLC) matrix 208 configured to facilitate the decoding of information or data received by the communications device 203. In one embodiment, the communications device 203 may include a generator matrix 210 that is configured to facilitate the encoding of information or data received by the communications device 203. In some embodiments, the LDLC matrix 208 and generator matrix 310 may be stored as part of the memory 206.

Figure 3:
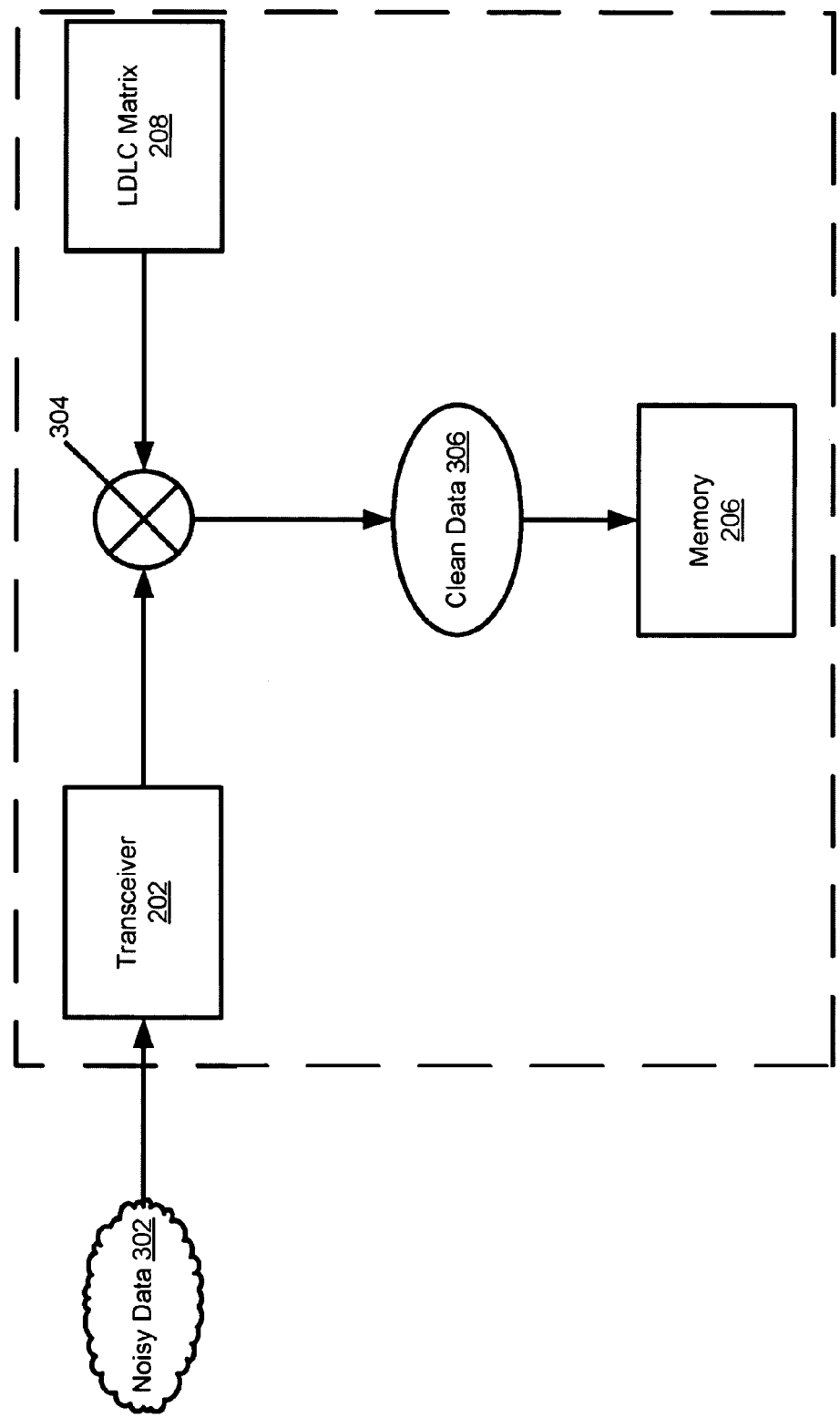
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include the apparatuses illustrated in FIG. 2. In various embodiments, the system 300 may include a transceiver 202, a processor or multiplier 304, a LDLC matrix 208, and a memory 206. In various embodiments, the controller 204 of FIG. 2 or an arithmetic logic unit (ALU) of the controller 204 may function as the processor 304. In various embodiments, the processor 304 may include a Tanner graph.

In one embodiment, the transceiver 202 may be configured to receive noisy data 302 via a communications channel. In various embodiments, the communications channel may include wired elements, wireless elements, or a combination thereof. In some embodiments, the noisy data 302 may include a clean data component and a noise component (not shown).

In various embodiments, the processor 304 may be configured to decode the received noisy data 302. In one embodiment, the processor 304 may multiply the noisy data 302 or a portion thereof, by a low density lattice code (LDLC) matrix 208. In various embodiments, the LDLC matrix 208 may merely be one tool utilized in the decoding of the noisy data 302. In some embodiments, the processor 304 may be configured to decode the noisy data 302 to substantially recover the afore mentioned clean data 306 component. In various embodiments, the processor 304 may utilize a linear-time integrative decoding scheme to decode the noisy data 302.

Figure 7:
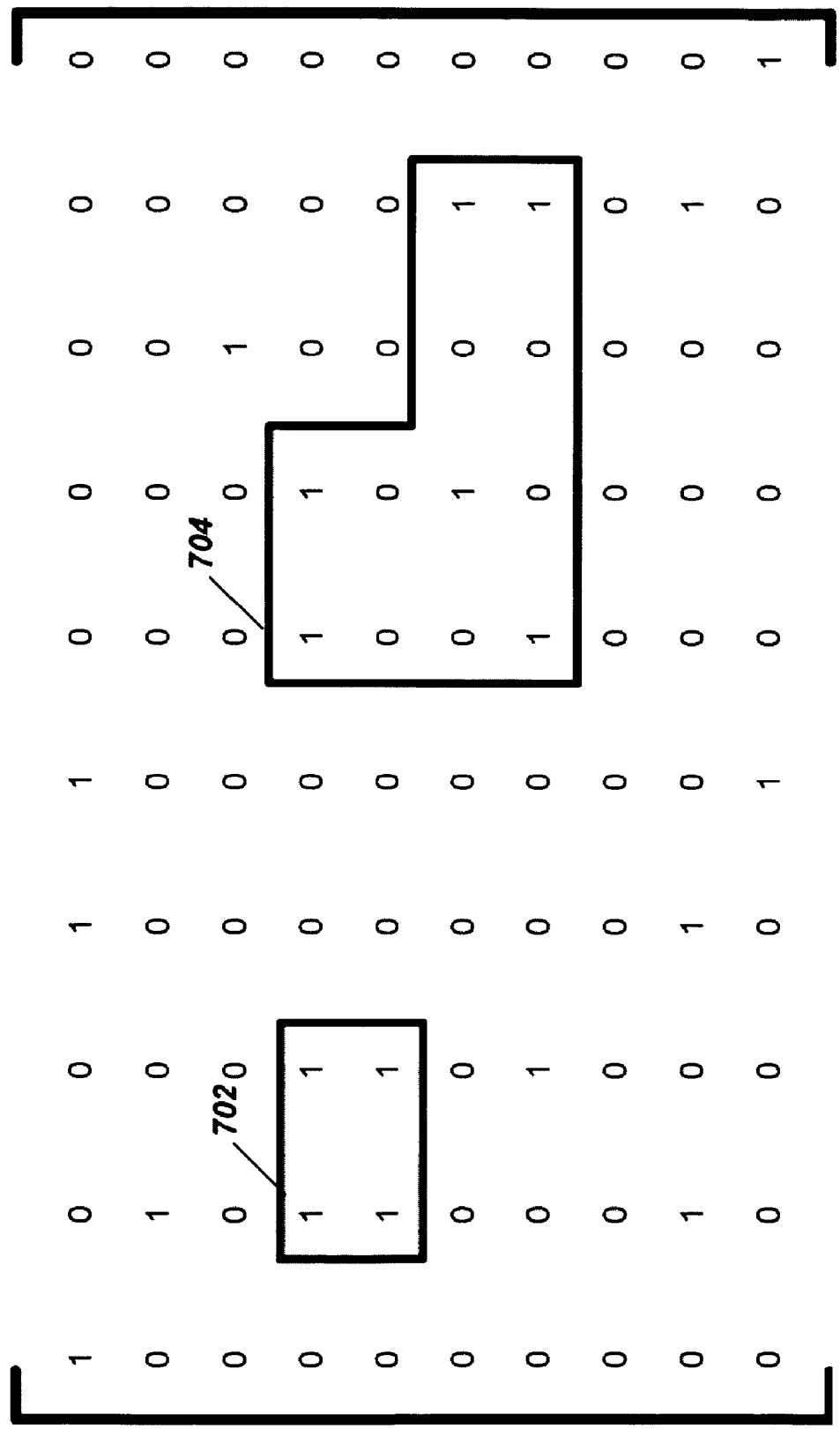
FIG. 7 is a graph of an example embodiment of a matrix relevant to the disclosed subject matter.

In various embodiments, the LDLC matrix 208 may be a matrix that does not include any cycles of length less than six. FIG. 7 is a graph of an example embodiment of a sparse matrix 700 relevant to the disclosed subject matter. The matrix 700 is considered sparse in that the number of zero elements of the matrix are substantially greater than the number of non-zero elements. Cycle 702 illustrates a four cycle or four loop, in which four non-zero values are grouped such that the form a square. Cycle 704 illustrates a six cycle or six loop, in which the six non-zero elements are grouped such that they form a six sided polygon. Typically, a matrix that includes a four loop (e.g., cycle 702) is considered very difficult to use and process. Therefore, it is desirable to use a LDLC matrix 208 that is guaranteed not to include such four-loops. In various embodiments, the LDLC matrix 208 may not include any cycles or loops at all, but the LDLC matrix 208 at a minimum, if it does include a loop or cycle, should not include any cycles of a length below six (e.g., cycle 704).

In various embodiments, the LDLC matrix 208 may include a matrix that is systematically algebraically constructed. In previous techniques, the LDLC matrix may have been generated by brute force, in that a matrix was generated and then tested to assure that no four-loops, as described above, were found. If the four-loops were found the LDLC matrix was discarded and another LDLC matrix was generated, until eventually such a matrix fit the correct parameters of the given technique. In one embodiment, the LDLC matrix 208 may have been constructed using a systematic algebraic approach that generates a LDLC matrix with either no cycles or cycles of a length greater than six. In various embodiments, the LDLC matrix 208 may have been constructed utilizing a systematic single-pass scheme employing Latin squares to select non-zero values of the LDLC matrix. In various embodiments, the LDLC matrix 208 may comprise a sparse matrix whose non-zero elements include values that are real numbers. Such construction is described below.

In various embodiments, the decoded clean data 306 may be stored within the memory 206. In another embodiment, the clean data 306 may only be temporarily stored within the memory 206. In yet another embodiment, the clean data 306 may be re-transmitted, possibly after undergoing additional processing, to another apparatus (e.g., a mobile station).

Figure 4:
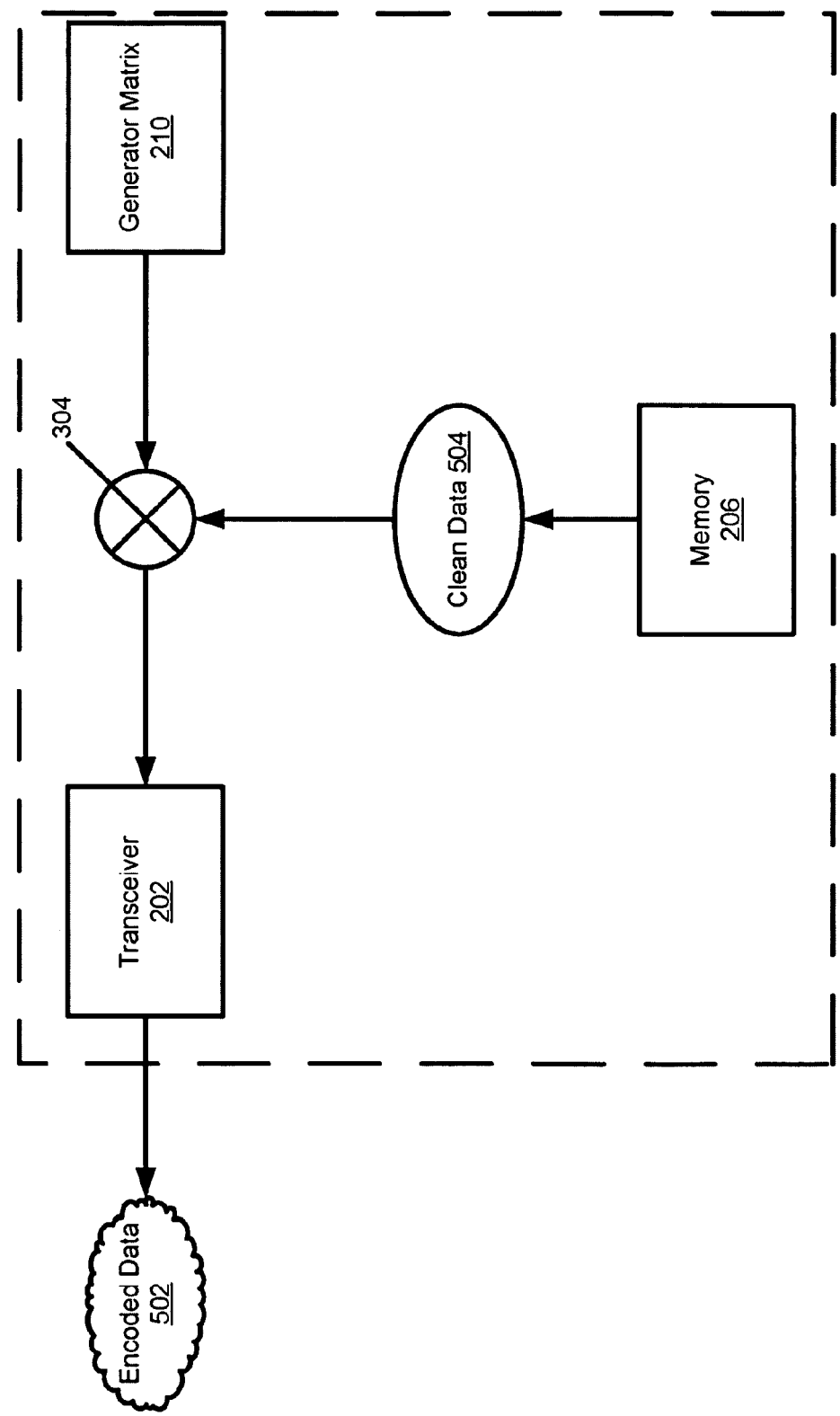
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include the apparatuses illustrated in FIG. 2. In various embodiments, the system 400 may include a transceiver 202, a processor or multiplier 304, a generator matrix 210, and a memory 206. In various embodiments, the controller 204 of FIG. 2 or an arithmetic logic unit (ALU) of the controller 204 may function as the processor 304, as described above.

In various embodiments, the memory 206 may be configured to store clean data 504 that is intended for transmission. In such an embodiment, the processor 304 may be configured to encode the clean data 405 utilizing a generator matrix 210. In various embodiments, the generator matrix 210 may include the inverse of the LDLC matrix 208 of FIGS. 2 and 3. In such an embodiment, the apparatus 400 may assume that the receiving device (not shown) may include a corresponding LDLC matrix 208 and will use that LDLC matrix 208 to decode the transmitted clean data 504. In various embodiments, the transceiver 202 may be configured to transmit the encoded data 502 to another device.

Figure 5:
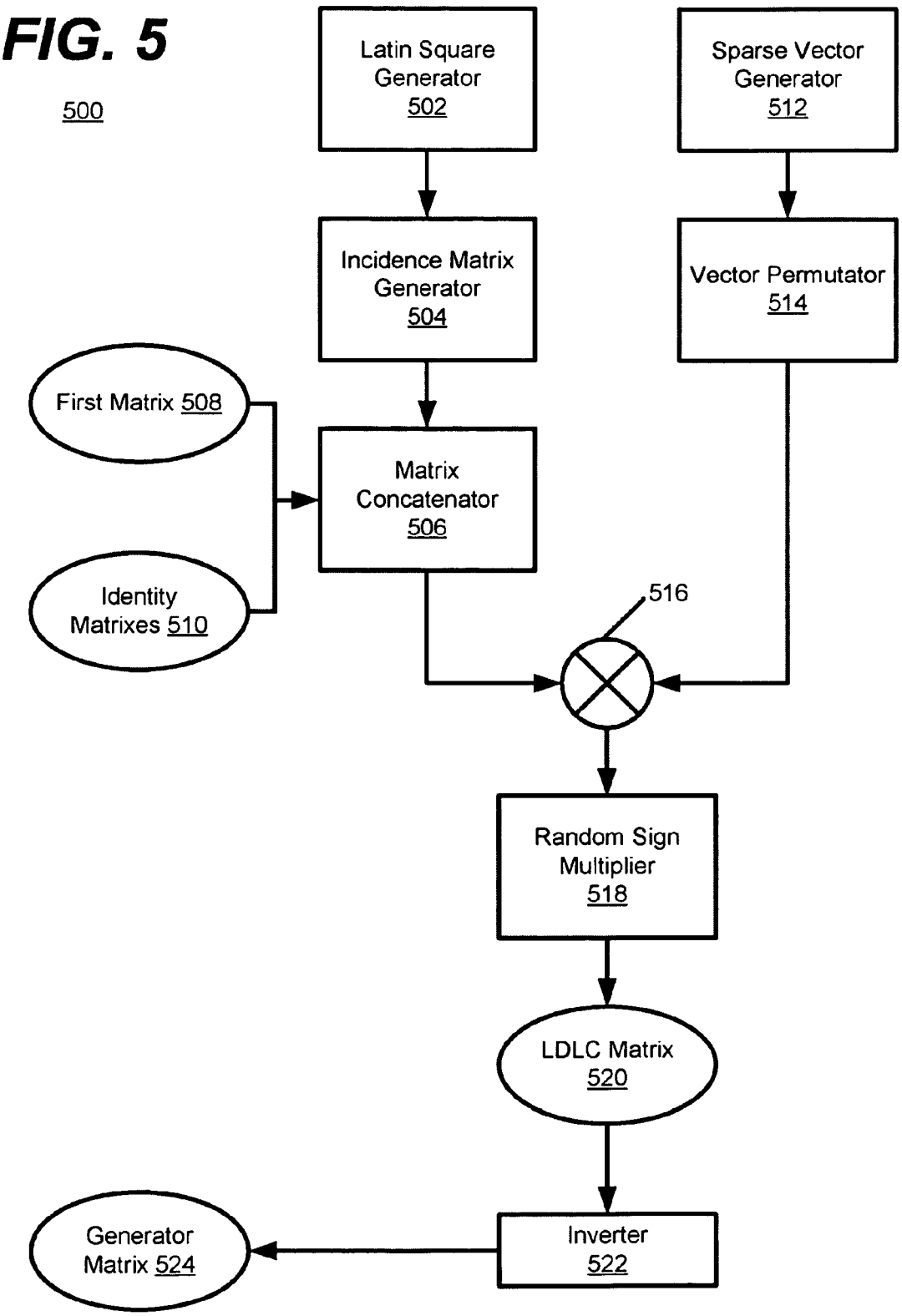
FIG. 5 is a block diagram of an example embodiment of a system in accordance with the disclosed subject matter.

FIG. 5 is a block diagram of an example embodiment of a system 500 in accordance with the disclosed subject matter. In one embodiment, the system 500 may be used to generate the LDLC matrix and generator matrix, described above in FIGS. 2, 3, and 4. In various embodiments, the controller 204 may include all or parts the system 500. In some embodiments, the memory 206 may include or store parts of the system 500. In various embodiments, the LDLC matrix 520 may be dynamically generated or constructed by an apparatus (e.g., BS 104, MS 106, or GW 112 of FIG. 1), or, in one embodiment, created and then statically stored by an apparatus.

In one embodiment, the system 500 may include a Latin square generator 502. In this context, a Latin square is a square (of p by p elements) matrix that includes p different symbols in such a way that each symbol occurs exactly once in each row and exactly once in each column. The below is an example of a Latin square:

$$L = \begin{bmatrix} 1 & 2 & 3 \\ 2 & 3 & 1 \\ 3 & 1 & 2 \end{bmatrix} \quad (\text{Eq 1})$$

In various embodiments, the system 500 may be configured to select a prime number (p) for the number of elements in each row and column of the generated Latin squares. In such an embodiment, the Latin square generator 502 may be configured to generate a plurality of mutually orthogonal Latin squares of size p by p. In some embodiments, the number of Latin squares generated may be one less than the selected prime number (i.e., p−1).

In various embodiments, the Latin square generator 502 may generate the Latin squares using the following equations:

$$L_k = [a_{ij}^k], \text{ in which} \quad (\text{Eq 2})$$

$$a_{ij}^k = (ki+j) \bmod(p) \quad (\text{Eq 3})$$

In various embodiments, the matrix index (k) may be equal to 1 to p−1, and the element index variables (i and j) may each be equal to 1 to p.

In one embodiment, the system 500 may include an incidence matrix generator 504. In various embodiments, the incidence matrix generator 504 may be configured to, for each of the plurality of Latin squares, produce an incidence matrix ($R_k$) based upon the respective Latin square. In some embodiments, these incidence matrixes ($R_k$) may include the prime number of elements by the prime number squared of elements (i.e., p by $p^2$ elements)

In this context, an incidence matrix is a matrix that shows the relationship between two classes of objects. If the first class is X and the second is Y, the matrix has one row for each element of X and one column for each element of Y. The entry in row x and column y is 1 if x and y are related (called incident in this context) and 0 if they are not. For example, given the Latin square of Eq 1 above the three incidence matrixes (for 1, 2, and 3 respectively) may include the following:

$$R_1 = \begin{bmatrix} 1 & 0 & 0 \\ 0 & 0 & 1 \\ 0 & 1 & 0 \end{bmatrix}_{3 \times 3} \quad (\text{Eqs. 4, 5, and 6})$$

$$R_2 = \begin{bmatrix} 0 & 1 & 0 \\ 1 & 0 & 0 \\ 0 & 0 & 1 \end{bmatrix}_{3 \times 3}$$

$$R_3 = \begin{bmatrix} 0 & 0 & 1 \\ 0 & 1 & 0 \\ 1 & 0 & 0 \end{bmatrix}_{3 \times 3}$$

In various embodiments, the system 500 may include a matrix concatenator 506. In some embodiments, the matrix concatenator 506 may be configured to concatenate a plurality of matrixes into one or more matrixes. In various embodiments, the matrix concatenator 506 may be configured create a mapping matrix (M), based upon a sub-set of the incidence matrixes (R).

In one embodiment, the matrix concatenator 506 may be configured to create the mapping matrix (M) by concatenating a first matrix ($M_1$) 508, a plurality of identity matrixes (collectively $M_2$) 510, and a sub-set of the incidence matrixes (R). In various embodiments, the subset of incidence matrixes (R) may include all incidence matrixes excluding the final two matrixes (i.e., $R_1$ through $R_{p-2}$).

In various embodiments, the first matrix ($M_1$) 508 may include a matrix of the prime number of elements by the prime number squared of elements (i.e., p by $p^2$ elements). In one embodiment, each row of the first matrix ($M_1$) 508 may include a prime number of sequential one valued elements. In various embodiments, the placement of the prime number of sequential one valued elements may be staggered such that a diagonal of ones is created. In various embodiments, the first matrix ($M_1$) 508 may be represented by the equation below:

$$M_1 = \begin{bmatrix} 111\ldots1_p & 0_1 & 0_2 & \ldots & 0_p \\ 0_1 & 111\ldots1_p & 0_2 & \ldots & 0_p \\ 0_1 & 0_2 & 111\ldots1_p & \ldots & 0_p \\ \vdots & \vdots & & \ddots & \\ 0_1 & 0_2 & \ldots & 0_p & 111\ldots1_p \end{bmatrix}_{p \times p^2} \quad (\text{Eq 7})$$

In various embodiments, the second matrix ($M_2$) 510 may include a vector of a plurality of identity matrices (I), as described above. In one embodiment, the second matrix ($M_2$) 510 may include a prime number of the identity matrices. In one embodiment, each identity matrix may be of a size equal to the prime number, as described in more detail below. Therefore, in such an embodiment, the total dimensions of the second matrix ($M_2$) 510 may be equal to the prime number of elements by the prime number squared of elements (i.e., p by $p^2$). In various embodiments, the second matrix ($M_2$) 510 may be represented by the equation below:

$$M_2 = [I_p \, I_p \, I_p \ldots I_p]_{p \times p^2} \quad (\text{Eq 8})$$

In this context, an identity matrix (I) or unit matrix includes a square matrix with ones on the main diagonal and zeros elsewhere. The subscript typically denotes the dimensions of the identity matrix (e.g., $I_3$ include a 3×3 matrix, $I_p$ includes a p×p matrix, etc.). An illustration of a 3 by 3 identity matrix is given below.

$$I_3 = \begin{bmatrix} 1 & 0 & 0 \\ 0 & 1 & 0 \\ 0 & 0 & 1 \end{bmatrix}_{3 \times 3} \quad \text{(Eq 9)}$$

In various embodiments, the matrix concatenator 506 may be configured to generate the first matrix ($M_1$) 508, and the plurality of identity matrixes (collectively $M_2$) 510. In some embodiments, the matrix concatenator 506 may be configured to concatenate the plurality of identity matrixes 510 into the second matrix ($M_2$), as described above.

As described above, in one embodiment, the matrix concatenator 506 may be configured to create the mapping matrix (M) by concatenating a first matrix ($M_1$) 508, plurality of identity matrixes (collectively $M_2$) 510, and a sub-set of the incidence matrixes (R). In various embodiments, the subset of incidence matrixes (R) may include all incidence matrixes excluding the final two matrixes (i.e., $R_1$ through $R_{p-2}$). In various embodiments, the mapping matrix (M) may be represented by the equation below:

$$M = \begin{bmatrix} M_1 \\ M_2 \\ R_1 \\ \vdots \\ R_{p-2} \end{bmatrix}_{p^2 \times p^2} \quad \text{(Eq 10)}$$

In various embodiments, the mapping matrix (M) may be configured to include elements having a value or either one or zero. In some embodiments, the mapping matrix (M) may be configured to have exactly the prime number (p) worth of elements on each row that are non-zero.

In various embodiments, the system 500 may include a sparse vector generator 512. In some embodiments, the sparse vector generator 512 may be configured to make a sparse vector (v). In one embodiment, the sparse vector (v) may include a prime number (p) of elements.

In various embodiments, the value of these elements may range between one and zero, inclusive. In such an embodiment, the first element of the sparse vector (v) may be normalized to one to facilitate convergence of a Tanner graph based decoding component (e.g., an embodiment of processor 304 of FIG. 3). In one embodiment, the sparse vector (v) may include a first portion of non-zero elements followed by a second portion of zero elements. In various embodiments, the sparse vector (v) may include a one element as the first element and the remaining elements of the first portion may be of decreasing value until a zero element is reached.

In various embodiments, the each sparse vector (v) may be represented by the equation below:

$$v = (h_1, h_2, \ldots, h_d, h_{d+1}, \ldots, h_p) \quad \text{(Eq 11)}$$

In one embodiment, the sparse vector generator 512 may be configured to create the sparse vector (v) with the following constraints (collectively referred to as "Eq. 12"):

$$h_1 \geq h_2 \geq \ldots \geq h_d \geq 0 \quad \text{(Eq 12.1)}$$

$$h_{d+1} = h_{d+2} = \ldots = h_p = 0 \quad \text{(Eq 12.2)}$$

$$d \ll p \quad \text{(Eq 12.3)}$$

p is a prime number, as described above. (Eq 12.4)

In various embodiments, the variable of "d" of Eq. 12 may be referred to as the non-zero limiting number (d).

In one embodiment, an illustrative example of the sparse vector (v) (ignoring constraint Eq. 12.3) may be shown below:

$$v = (1, 0.3443, 0.2951, 0.0492, 0, 0, 0), \text{ where } d=4 \text{ and } p=7 \quad \text{(Eq 13)}$$

In various embodiments, the system 500 may include a vector permutator 514. In various embodiments, the vector permutator 514 may be configured to permute the sparse vector (v) to form a permutation vector ($v_\pi$). It is noted that because the initial sparse vector (v) is sparse, the permutation vector ($v_\pi$) will also be a sparse vector.

In one embodiment, the vector permutator 514 may be configured to shuffle or swizzle the elements of the initial sparse vector (v) such that a one-to-one mapping of elements between the initial sparse vector (v) and the permutation vector ($v_\pi$) may be found. In one embodiment, the permuting of elements may occur in a substantially random fashion. In another embodiment, the permuting of elements may occur via a pre-defined function or mapping scheme. In various embodiments, the permutation vector ($v_\pi$) may be represented by the equation below, where $\pi(m)$ denotes the mapping of the $m^{th}$ element of the initial sparse vector (v):

$$v_\pi = (v_{\pi(1)}, v_{\pi(2)}, \ldots, v_{\pi(p)}) \quad \text{(Eq 14)}$$

In various embodiments, the vector permutator 514 may be configured to generate a plurality of permutation vectors ($v_\pi$). In one embodiment, the vector permutator 514 may be configured to generate a permutation vector ($v_\pi$) for each row of the mapping matrix. In another embodiment, the vector permutator 514 may be configured to generate the prime number squared worth of permutation vectors ($v_\pi$). In various embodiments, each of the plurality of permutation vectors ($v_\pi$) may be based upon the initial sparse vector (v), but with a different permutation function. In another embodiment, the permutation function may be substantially random, such that it may be possible for two of the permutation vectors ($v_\pi$) to be identical.

In various embodiments, the system 500 may include a combiner 516. In various embodiments, the combiner 516 may be configured to, for each row of the mapping matrix (M), assign to the non-zero elements of the row a value from a corresponding sparse permutation vector ($v_\pi$). In one embodiment in which a permutation vector ($v_\pi$) is generated for each row of the mapping matrix (M), the combiner 516 and vector permutator 514 may work in concert to generate a corresponding permutation vector ($v_\pi$) as it is needed by the combiner 516. In various embodiments, the non-zero elements of the mapping matrix (M) may simply be assigned their corresponding values from the corresponding permutation vector ($v_\pi$). Such that, in one embodiment, the first non-zero element is assigned the first element of the corresponding sparse permutation vector ($v_\pi$). The second non-zero element is assigned the second element of the corresponding sparse permutation vector ($v_\pi$), and so on.

In various embodiments, the assignment of the permutation vector ($v_\pi$) to the non-zero elements of the mapping matrix (M) may be represented by the rule below, where i and j are the indexes of the rows and columns of the mapping matrix (M), respectively, and there are p non-zero elements per each row of the mapping matrix (M), as described above:

$$(M_{i,j(1)} = v_{\pi(1)}, M_{i,j(2)} = v_{\pi(2)}, \ldots M_{i,j(p)} = v_{\pi(p)}) \quad \text{(Eq 15)}$$

In various embodiments, the combiner 516 may be configured to produce a square matrix the size of the prime number (p) squared (i.e., dimensions of $p^2 \times p^2$). In one embodiment, the combiner 516 may be configured to produce a matrix in which the non-zero elements of each row are ordered identically to a permutation vector ($v_\pi$) which has been constructed for use with that particular row and wherein each row is associated with a different permutation vector, as described above. In another embodiment, the combiner 516 may be configured to produce a matrix in which there are the non-zero limiting number (d) of non-zero elements per row, where the non-zero limiting number (d) is selected to be much smaller than the prime number (p), as described above in Eq. 12. In various embodiments, the matrix produced by the combiner 516 from the mapping matrix (M) and the plurality of sparse permutation vectors ($v_\pi$) may be referred to as a mapped matrix ($M_\pi$).

In various embodiments, the system 500 may include a random sign multiplier 518. In one embodiment, the random sign multiplier 518 may be configured to multiply each element of the mapped matrix ($M_\pi$) by a substantially random one or negative one. In some embodiments, the random sign multiple 518 may be configured to only multiply the non-zero elements of the mapped matrix ($M_\pi$) by a substantially random one or negative one. In various embodiments, the substantially random one or negative one may be determined for each element, such that the sign (positive or negative) component of each element (or at least each non-zero element) is randomly changed or not changed. In one embodiment, the random sign multiplier 518 may be configured to produce the LDLC matrix (H) 520 using the mapped matrix ($M_\pi$).

In various embodiments, the production of the LDLC matrix (H) 520 using the mapped matrix ($M_\pi$) may be represented by the rule below, where i and j are the indexes of the rows and columns of the matrices:

$$(H_{i,j} = M_{\pi ij} * rand(1,-1)) \quad (Eq\ 16)$$

In various embodiments, the system 500 may include an inverter 522. In one embodiment, the inverter 522 may be configured to produce a generator matrix (G) 524 based upon the LDLC matrix (H) 520. In various embodiments, the inverter 522 may be configured to take the inverse of the LDLC matrix (H) 520. In various embodiments, the unsigned determinate of the generator matrix (G) 524 may be equal to one (i.e., |det(G)|=1). In various embodiments, the generator matrix (G) 524 may be a sparse matrix. In various embodiments, the inverter 522 may be configured to produce the generator matrix (G) 524 utilizing the equation below:

$$G = H^{-1} \quad (Eq\ 17)$$

In various embodiments, the generator matrix (G) 524, as described above, may be used to encode a portion of clear data (b) in to an encoded data portion (x). In one embodiment, this may be represented by the equation below:

$$x = Gb \quad (Eq\ 18)$$

Likewise, in one embodiment, the LDLC matrix (H) 522 may be configured to aid in decoding an encoded data apportion (x) into a clear data portion (b). In one embodiment, this may be represented by the equation below:

$$b = Hx \quad (Eq\ 19)$$

In various embodiments, the LDLC matrix 522 and the generator matrix 524 may be stored within a memory (e.g., memory 206 of FIG. 2).

Figure 6:
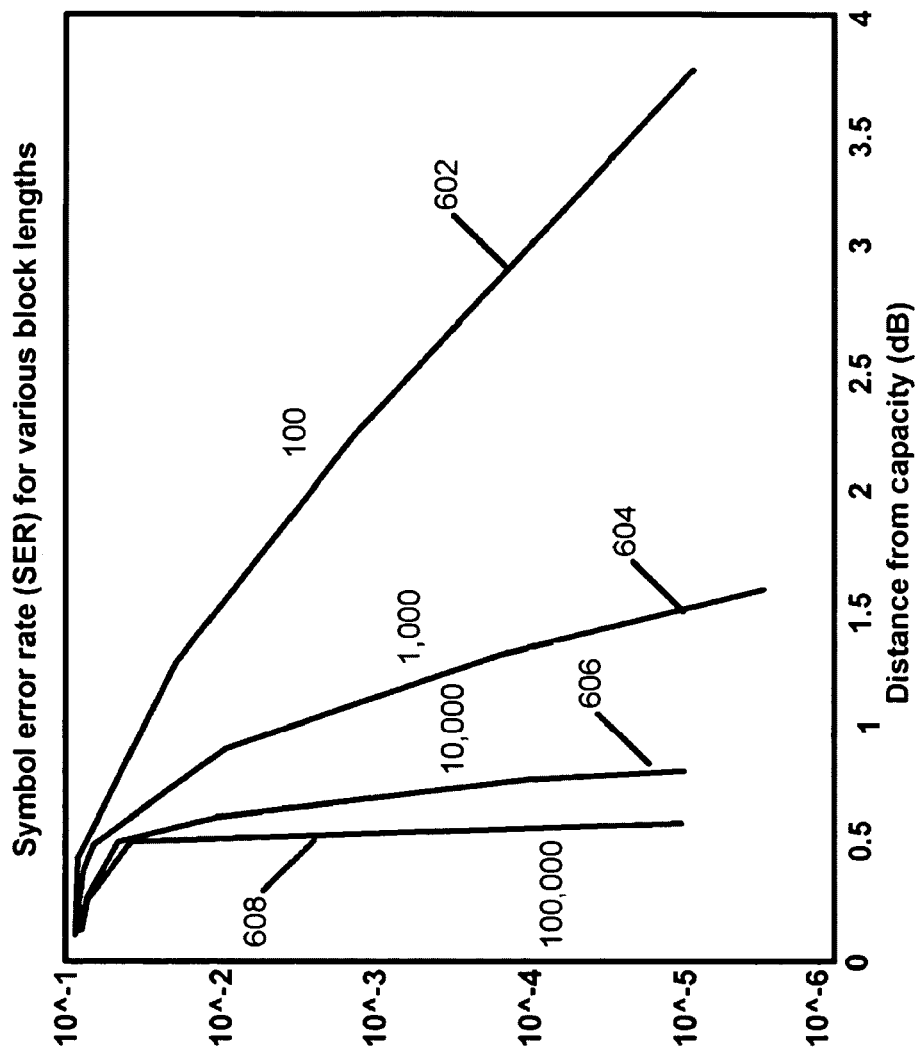
FIG. 6 is a graph of an example embodiment of the results of a system relevant to the disclosed subject matter.

FIG. 6 is a graph 600 of an example embodiment of results of a system relevant to the disclosed subject matter and expected of the disclosed subject matter. Graph 600 illustrates four variations of an encoding/decoding efficiency of one embodiment of LDLC matrix codes. In such an embodiment, the LDLC matrix codes were constructed using a non-algebraic "brute force" approach, as described above. N. Sommer, M. Feder and O. Shalvi, "Low Density Lattice Codes", 2006 *IEEE International Symposium on Information Theory*, July 2006, pp. 88-92. In various embodiments, it can been seen that as the block size (number of symbols) used in one encoding/decoding the closer the disclosed subject matter performs to the theoretical Shannon capacity of the communications channel.

In various embodiments, line 602 illustrates that with a block size of approximately 100 symbols an error performance of >4 dB from the Shannon theoretical capacity may be obtained at a symbol error rate of $10^{-6}$. In one embodiment, line 604 illustrates that with a block size of approximately 1,000 symbols an error performance of >1.5 dB but <2 dB from the Shannon theoretical capacity may be obtained at a symbol error rate of $10^{-6}$. In other embodiment, line 606 illustrates that with a block size of approximately 10,000 symbols an error performance of <1 dB from the Shannon theoretical capacity may be obtained at a symbol error rate of $10^{-6}$. In various embodiments, line 608 illustrates that with a block size of approximately 100,000 symbols an error performance of ~0.5 dB from the Shannon theoretical capacity may be obtained at a symbol error rate of $10^{-6}$.

Figure 8:
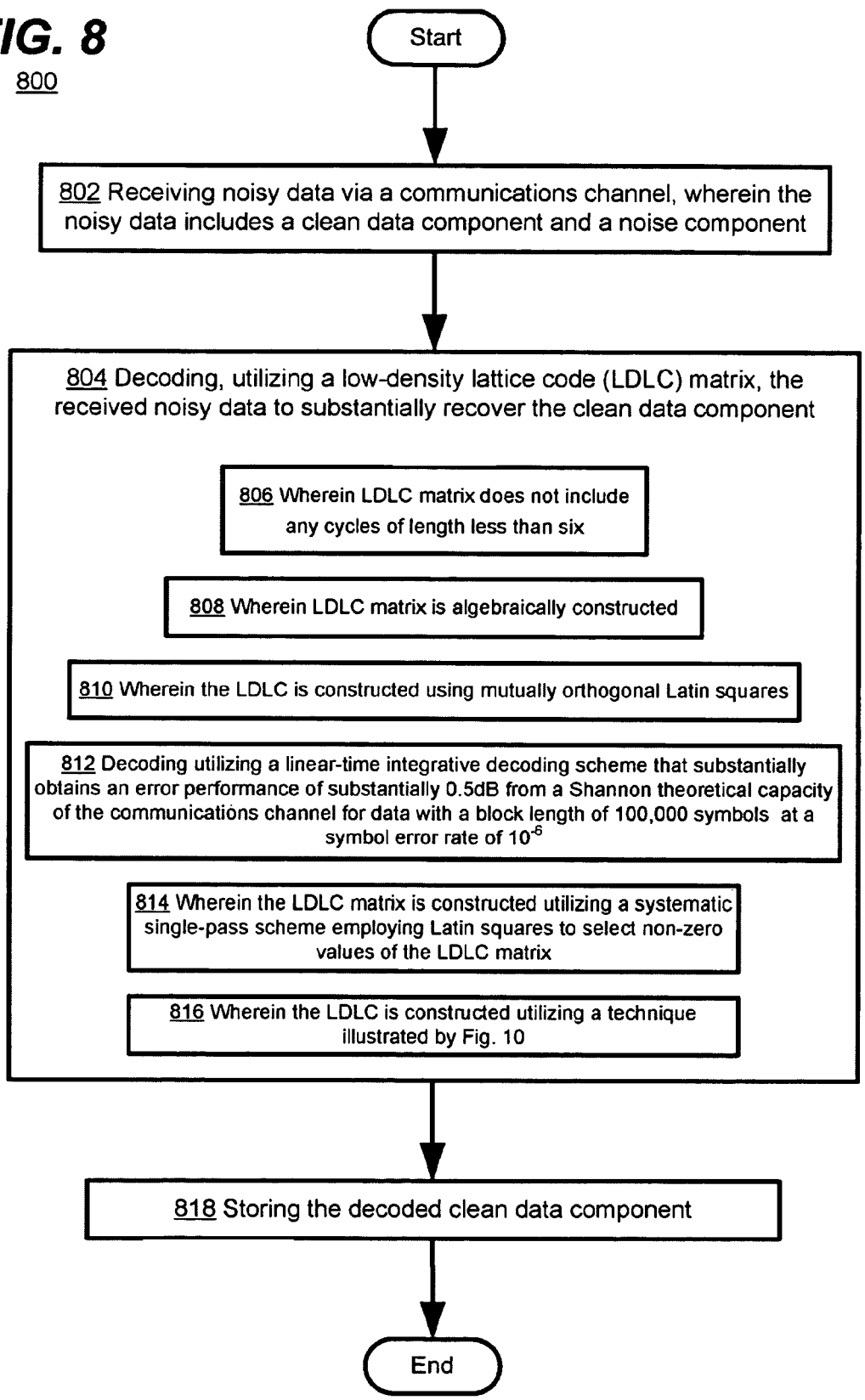
FIG. 8 is a flowchart of an example embodiment of a technique in accordance with the disclosed subject matter.

FIG. 8 is a flowchart of an example embodiment of a technique in accordance with the disclosed subject matter. In various embodiments, parts or all of the technique 800 may be the results of the operations of the system 100 of FIG. 1 or the apparatuses of FIGS. 2 and 3. Although, it is understood that other systems and timing diagrams may produce technique 800.

Block 802 illustrates that, in one embodiment, noisy data may be received via a communications channel, wherein the noisy data includes a clean data component and a noise component, as described above. In various embodiments, the action described above may be performed by a transceiver 202 of FIG. 2 or 3, as described above.

Block 804 illustrates that, in one embodiment, the received noisy data may be decoded, utilizing a low-density lattice code (LDLC) matrix, to substantially recover the clean data component, as described above. Block 806 illustrates that, in one embodiment, decoding may include using a LDLC matrix that does not include any cycles of length less than six, as described above. Block 808 illustrates that, in one embodiment, decoding may include using a LDLC matrix that may be algebraically constructed, as described above. Block 810 illustrates that, in one embodiment, decoding may include using a LDLC matrix that may be constructed using mutually orthogonal Latin squares, as described above. Block 812 illustrates that, in one embodiment, decoding may include decoding utilizing a linear-time integrative decoding scheme that substantially obtains an error performance of substantially 0.5 dB from a Shannon theoretical capacity of the communications channel for data with a block length of 100,000 symbols at a symbol error rate of $10^{-6}$, as described above. Block 814 illustrates that, in one embodiment, decoding may include using a LDLC matrix that may be constructed utilizing a systematic single-pass scheme employing Latin squares to select non-zero values of the LDLC matrix, as described above. Block 816 illustrates that, in one embodiment, decoding may include using a LDLC matrix that may be constructed utilizing a technique illustrated by FIG. 10, as described above and below. In various embodiments, the actions described above may be performed by a controller 204 of FIG. 2 or the system 300 of FIG. 3, as described above.

Block 818 illustrates that, in one embodiment, the decoded clean data component may be stored, as described above. In various embodiments, the action described above may be performed by a memory 206 of FIG. 2 or 3, as described above.

FIG. 9 is a flowchart of an example embodiment of a technique in accordance with the disclosed subject matter. In various embodiments, parts or all of the technique 900 may be the results of the operations of the system 100 of FIG. 1 or the apparatuses of FIGS. 2 and 4. Although, it is understood that other systems and timing diagrams may produce technique 900.

Block 902 clean data for transmission may be acquired, as described above. In various embodiments, the action described above may be performed by a memory 206 or controller 204 of FIG. 2 or apparatus 400 of FIG. 4, as described above.

Block 904 illustrates that, in one embodiment, the clean data may be encoded with a lattice generator matrix to produce encoded data, as described above. Block 906 illustrates that, in one embodiment, the lattice generator matrix may include the inverse of the low-density lattice code (LDLC) matrix of FIG. 8, as described above. In various embodiments, the action described above may be performed by a controller 204 of FIG. 2 or apparatus 400 of FIG. 4, as described above. In various embodiments, the generator matrix 210 of FIGS. 2 and 4 may be used, as described above. In various embodiments, the LDLC matrix 208 of FIGS. 2 and 3 may be used, as described above.

Block 908 illustrates that, in one embodiment, the encoded data may be transmitted, as described above. In various embodiments, the transmission may occur via a noisy communications channel, as described above. In various embodiments, the action described above may be performed by a transceiver 202 of FIG. 2 or apparatus 400 of FIG. 4, as described above.

Figure 10A:
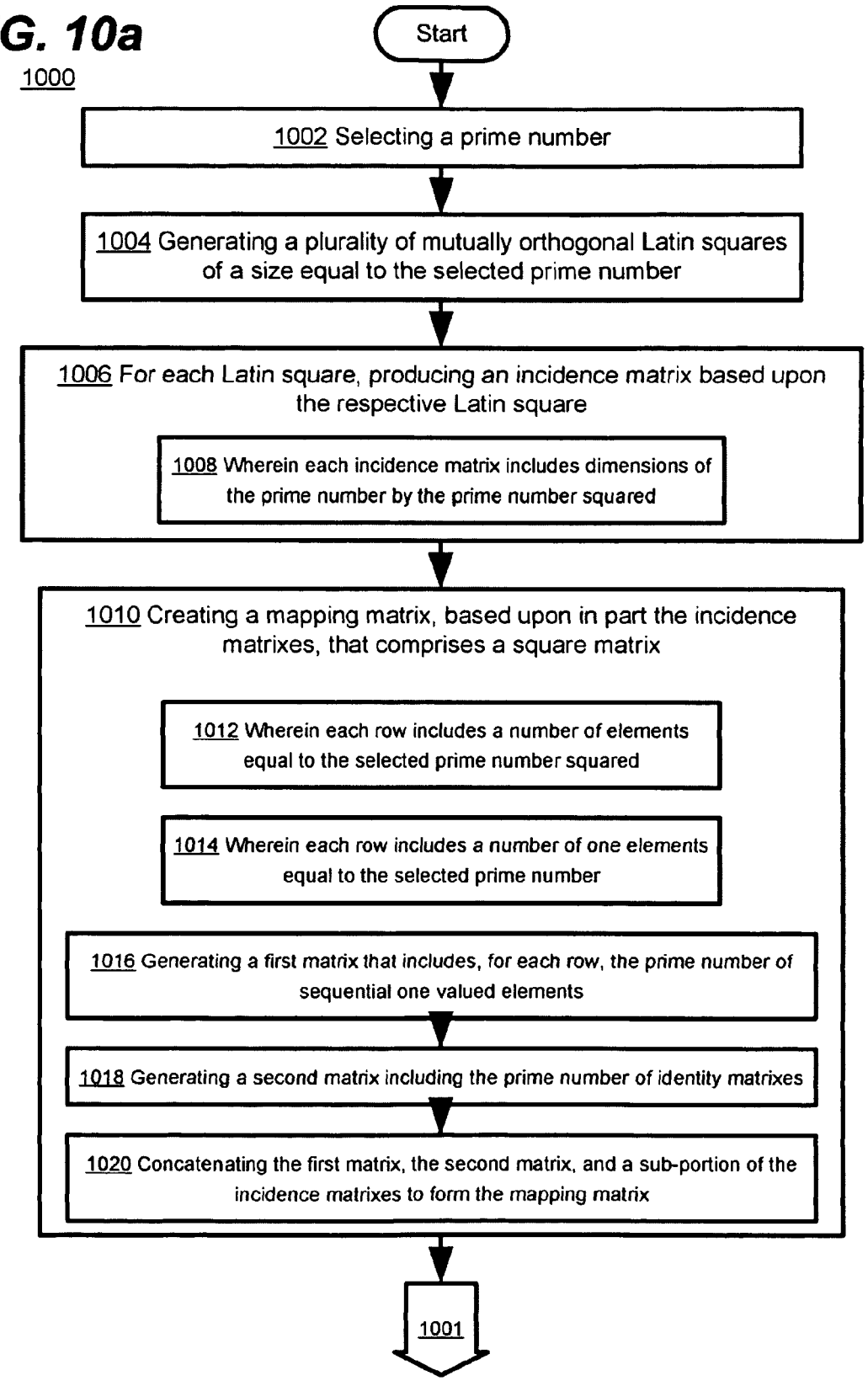
FIG. 10 is a flowchart of an example embodiment of a technique in accordance with the disclosed subject matter.
Figure 10B:
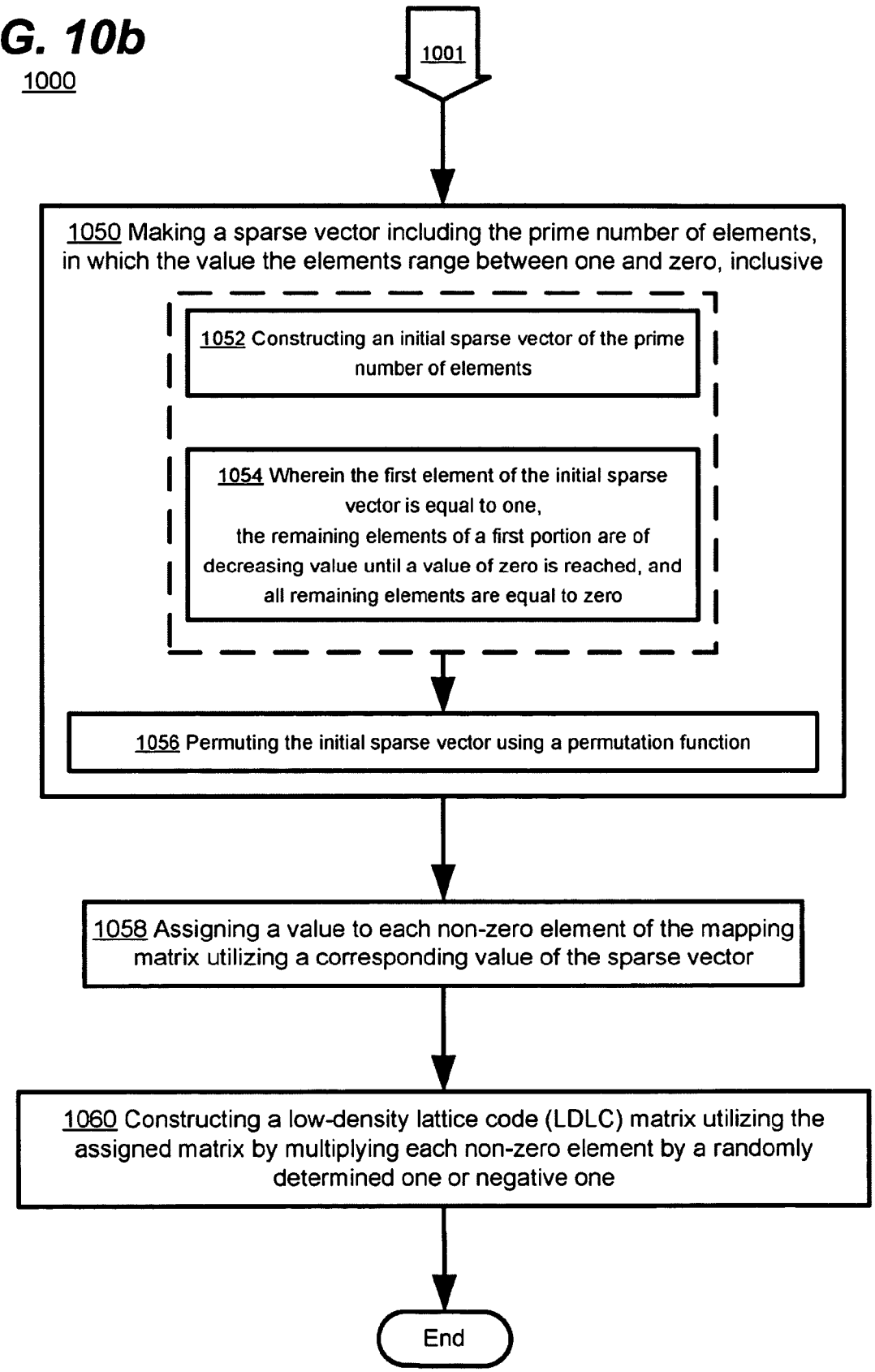

FIG. 10 is a flow chart of an example embodiment of a technique 1000 in accordance with the disclosed subject matter. In various embodiments, parts or all of the technique 1000 may be the results of the operations of the system 500 of FIG. 5, apparatuses 200 of FIG. 2, or system 100 of FIG. 1. In various embodiments, the technique 1000 may result in a low-density lattice code (LDLC) matrix such as LDLC matrix 208 of FIGS. 2, 3, and 5. Although, it is understood that other systems and timing diagrams may produce technique 1000. Furthermore, it is understood that FIGS. 10a and 10b represent a single flowchart illustrated on multiple pages and connected via the connectors of Block 1001, here-before and here after the multiple pages will simply be referred to as FIG. 10.

Block 1002 illustrates that, in one embodiment, a prime number may be selected, as described above. In various embodiments, the action described above may be performed by the controller 204 of FIG. 2 of the system 500 of FIG. 5, as described above.

Block 1004 illustrates that, in one embodiment, a plurality of mutually orthogonal Latin squares of a size equal to the selected prime number may be generated, as described above. In various embodiments, the action described above may be performed by the controller 204 of FIG. 2 of the Latin square generator 502 of FIG. 5, as described above.

Block 1006 illustrates that, in one embodiment, for each Latin square, an incidence matrix based upon the respective Latin square may be produced, as described above. Block 1008 illustrates that, in one embodiment, each incidence matrix may include dimensions of the prime number by the prime number squared, as described above. In various embodiments, the actions described above may be performed by the controller 204 of FIG. 2 of the incidence matrix generator 504 of FIG. 5, as described above.

Block 1010 illustrates that, in one embodiment, a mapping matrix may be created, based upon in part the incidence matrixes, that comprises a square matrix, as described above. Block 1012 illustrates that, in one embodiment, each row of the mapping matrix may include a number of elements equal to the selected prime number squared, as described above. Block 1014 illustrates that, in one embodiment, each row of the mapping matrix may include a number of one elements equal to the selected prime number, as described above. In various embodiments, the actions described above may be performed by the controller 204 of FIG. 2 of the matrix concatenator 506 of FIG. 5, as described above.

Block 1016 illustrates that, in one embodiment, creating the mapping matrix may include generating a first matrix that includes, for each row, the prime number of sequential one valued elements, as described above. In various embodiments, the dimensions of the first matrix are the prime number by the prime number squared, as described above. Block 1018 illustrates that, in one embodiment, creating the mapping matrix may include generating a second matrix including the prime number of identity matrixes, as described above. In various embodiments, the dimension of each identity matrix may be equal to the prime number, as described above. Block 1020 illustrates that, in one embodiment, creating the mapping matrix may include concatenating the first matrix, the second matrix, and a sub-portion of the incidence matrixes to form the mapping matrix, as described above. In various embodiments, the actions described above may be performed by the controller 204 of FIG. 2 of the matrix concatenator 506 of FIG. 5, as described above.

Block 1050 illustrates that, in one embodiment, a sparse vector including the prime number of elements, may be made, for each row of the mapping matrix, as described above. In some embodiments, the sparse vectors may include elements that range between one and zero, inclusive, as described above. Block 1052 illustrates that, in one embodiment, making may include constructing an initial sparse vector of the prime number of elements, as described above. Block 1054 illustrates that, in one embodiment, the initial sparse vector may include a first element of the initial sparse vector is equal to one, the remaining elements of a first portion are of decreasing value until a value of zero is reached, and all remaining elements are equal to zero, as described above. Block 1056 illustrates that, in one embodiment, making may include permuting, for each row of the mapping matrix, the initial sparse vector using a permutation function, as described above. In some embodiments, a different permutation function may be used for each permutated vector created, as described above. In various embodiments, the actions described above may be performed by the controller 204 of FIG. 2 of the sparse vector generator 512 or vector permutator 514 of FIG. 5, as described above.

Block 1058 illustrates that, in one embodiment, for each row of a the mapping matrix a value to each non-zero element of the row may be assigned utilizing a corresponding value of the respective sparse vector, as described above. In various embodiments, the actions described above may be performed by the controller 204 of FIG. 2 of the combiner 516 of FIG. 5, as described above.

Block 1060 illustrates that, in one embodiment, a low-density lattice code (LDLC) matrix may be constructed utilizing the assigned matrix by multiplying each non-zero element by a substantially randomly determined one or negative one, as described above. In various embodiments, the actions described above may be performed by the controller 204 of FIG. 2 of the random sign multiplier 518 of FIG. 5, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   receiving noisy data via a communications channel, wherein the noisy data includes a clean data component and a noise component;
   decoding, utilizing a low-density lattice code (LDLC) matrix, the received noisy data to substantially recover the clean data component;
   storing the decoded clean data component;
   wherein LDLC matrix does not include any cycles of length less than six,
   wherein LDLC matrix is algebraically constructed, and
   wherein the LDLC includes a sparse matrix whose non-zero elements include values that are real numbers.

2. The method of claim 1 wherein the LDLC is constructed using mutually orthogonal Latin squares.

3. The method of claim 1 wherein decoding includes a linear-time integrative decoding scheme that substantially obtains an error performance of substantially 0.5 dB from a Shannon theoretical capacity of the communications channel for data with a block length of 100,000 symbols at a symbol error rate of $10^{-6}$.

4. The method of claim 1 wherein decoding includes utilizing an LDLC matrix whose construction includes:
   selecting a prime number;
   generating a plurality of mutually orthogonal Latin squares of a size equal to the selected prime number;
   for each Latin square, producing an incidence matrix based upon the respective Latin square;
   creating a mapping matrix, based upon in part the incidence matrixes, that comprises a square matrix,
      wherein each row includes a number of elements equal to the selected prime number squared, and
      a number of non-zero elements equal to the selected prime number, and
   wherein each non-zero element has a value of one;
   making, for each row of the mapping matrix, a sparse vector including the prime number of elements, in which the value the elements range between one and zero, inclusive;
   assigning, for each row of the mapping matrix, a value to each non-zero element of the row utilizing a corresponding value of the respective sparse vector; and
   constructing the LDLC matrix utilizing the assigned matrix by multiplying each non-zero element by a substantially randomly determined one or negative one.

5. The method of claim 4 wherein each incidence matrix includes dimensions of the prime number by the prime number squared.

6. The method of claim 4 wherein creating a mapping matrix includes:
   generating a first matrix that includes, for each row, the prime number of sequential one valued elements, and
   wherein the dimensions of the first matrix are the prime number by the prime number squared;

generating a second matrix including the prime number of identity matrixes, and
wherein the dimension of each identity matrix the equal to the prime number; and
concatenating the first matrix, the second matrix, and a sub-portion of the incidence matrixes to form the mapping matrix.

7. The method of claim 4 wherein making includes:
constructing an initial sparse vector of the prime number of elements,
wherein the first element of the initial sparse vector is equal to one,
the remaining elements of a first portion are of decreasing value until a value of zero is reached, and
all remaining elements are equal to zero; and
permuting, for each row of the mapping matrix, the initial sparse vector using a permutation function.

8. The method of claim 1 wherein the LDLC matrix is constructed utilizing a systematic single-pass scheme employing Latin squares to select non-zero values of the LDLC matrix.

9. The method of claim 1 further including:
encoding clean data with a lattice generator matrix to produce encoded data;
transmitting the encoded data via a noisy communications channel; and
wherein the lattice generator matrix includes the inverse of the LDLC matrix.

10. An apparatus comprising:
a transceiver configured to:
receive noisy data via a communications channel, wherein the noisy data includes a clean data component and a noise component;
a controller configured to:
decode, utilizing a low-density lattice code (LDLC) matrix, the received noisy data to substantially recover the clean data component;
a memory configured to:
store the decoded clean data component; and
the low-density lattice code (LDLC) matrix that does not include any cycles of length less than six, and wherein LDLC matrix is algebraically constructed, and wherein the LDLC includes a sparse matrix whose non-zero elements include values that are real numbers.

11. The apparatus of claim 10 wherein the LDLC is constructed using mutually orthogonal Latin squares.

12. The apparatus of claim 10 wherein the controller is configured to:
decode the received data utilizing linear-time integrative decoding scheme that substantially obtains an error performance of substantially 0.5 dB from a Shannon theoretical capacity of the communications channel for data with a block length of 100,000 symbols at a symbol error rate of $10^{-6}$.

13. The apparatus of claim 10 wherein the controller is configured to:
select a prime number, and
wherein the controller comprises:
a Latin square generator configured to generate a plurality of mutually orthogonal Latin squares of a size equal to the selected prime number;
an incidence matrix generator configured to, for each Latin square, produce an incidence matrix based upon the respective Latin square;
a matrix concatenator configured to:
create a mapping matrix, based upon in part the incidence matrixes, that comprises a square matrix, wherein each row includes a number of elements equal to the selected prime number squared, a number of non-zero elements equal to the selected prime number, and wherein each non-zero element has a value of one; a sparse vector generator configured to, for each row of the mapping matrix, make a sparse vector including the prime number of elements, in which the value the elements range between one and zero, inclusive; a combiner configured to, for each row of the mapping matrix, assign a value to each non-zero element of the row utilizing a corresponding value of the respective sparse vector; and a random sign multiplier configured to construct the LDLC matrix utilizing the assigned matrix by multiplying each non-zero element by a substantially randomly determined one or negative one.

14. The apparatus of claim 13 wherein the incidence matrix generator is configured to produce, for each Latin square, an incidence matrix including dimensions of the prime number by the prime number squared.

15. The apparatus of claim 13 the sparse vector generator is configured to:
construct an initial sparse vector of the prime number of elements, wherein the first element of the initial sparse vector is equal to one, the remaining elements of a first portion are of decreasing value until a value of zero is reached, and all remaining elements are equal to zero; and the controller further includes:
a vector permutator configured to, for each row of the mapping matrix, permute the initial sparse vector using a permutation function.

16. The apparatus of claim 13 wherein the matrix concatenator is configured to:
acquire a first matrix that includes, for each row, the prime number of sequential one valued elements, and wherein the dimensions of the first matrix are the prime number by the prime number squared; acquire a second matrix including the prime number of identity matrixes, and wherein the dimension of each identity matrix the equal to the prime number; and concatenate the first matrix, the second matrix, and a sub-portion of the incidence matrixes to form the mapping matrix.

17. The apparatus of claim 10 wherein the controller is configured to decode utilizing a LDLC matrix that is constructed utilizing a systematic single-pass scheme employing Latin squares to select non-zero values of the LDLC matrix.

18. The apparatus of claim 10 wherein the controller is further configured to: encode clean data with a lattice generator matrix to produce encoded data, wherein the lattice generator matrix includes the inverse of the LDLC matrix; and wherein the transceiver is configured to: transmit the encoded data via a noisy communications channel.

19. An apparatus comprising:
a transceiver configured to:
receive noisy data via a communications channel, wherein the noisy data includes a clean data component and a noise component;
a controller configured to:
decode, utilizing a low-density lattice code (LDLC) matrix, the received noisy data to substantially recover the clean data component;
a memory configured to:
store the decoded clean data component; and
the low-density lattice code (LDLC) matrix that does not include any cycles of length less than six, and wherein LDLC matrix is algebraically constructed using mutually orthogonal Latin squares.

* * * * *